UNITED STATES PATENT OFFICE.

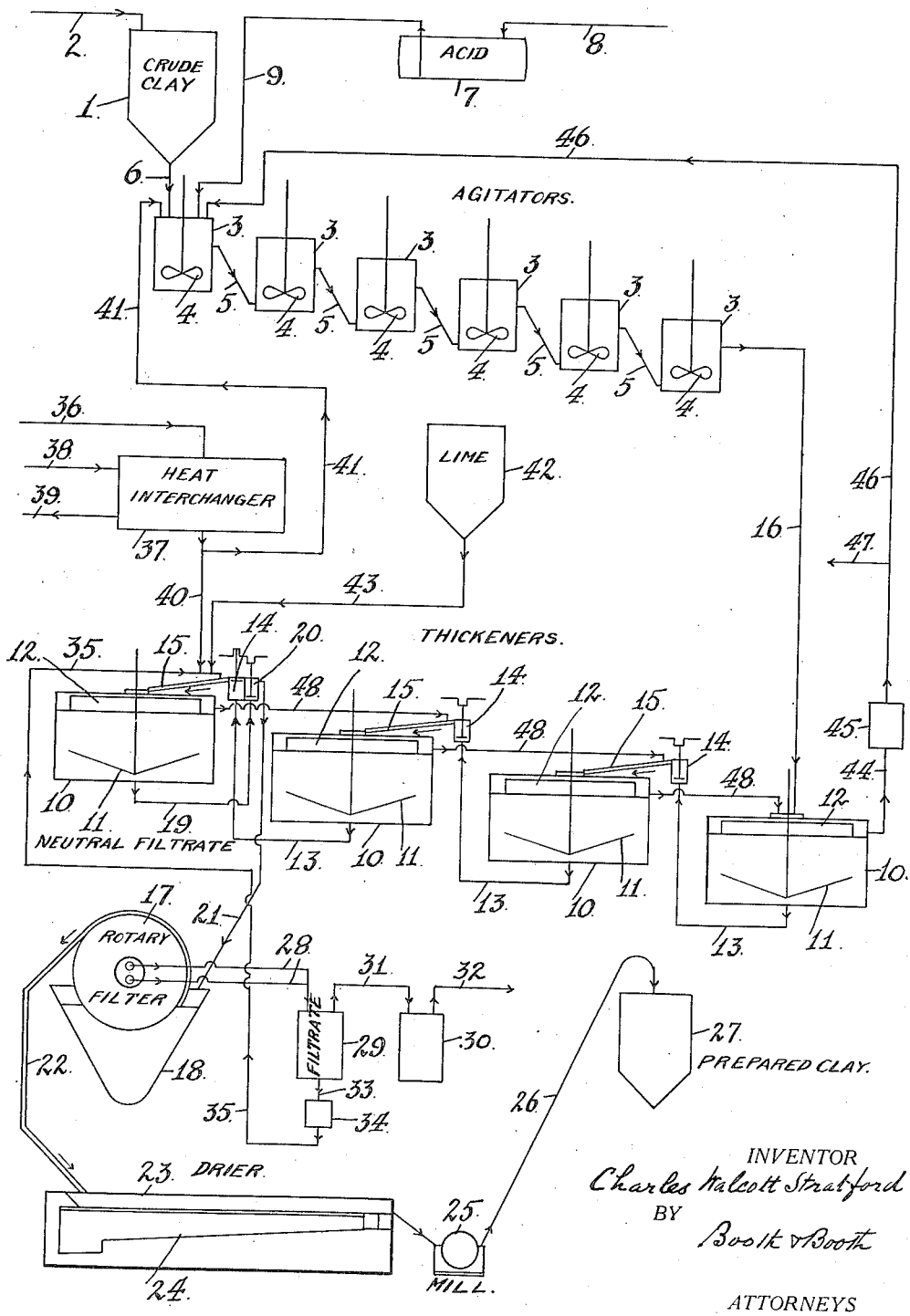

CHARLES WALCOTT STRATFORD, OF SAN FRANCISCO, CALIFORNIA.

METHOD OF PREPARING CLAY FOR BLEACHING PETROLEUM PRODUCTS.

1,408,655.     Specification of Letters Patent.     Patented Mar. 7, 1922.

Application filed March 21, 1921. Serial No. 454,210.

*To all whom it may concern:*

Be it known that I, CHARLES WALCOTT STRATFORD, a citizen of the United States, residing at the city and county of San Francisco and State of California, have invented certain new and useful Improvements in Methods of Preparing Clay for Bleaching Petroleum Products, of which the following is a specification.

My invention relates in general to the art of bleaching or decolorizing petroleum products, and particularly to those methods and processes which involve the use of argillaceous material or "bleaching" earths, serving as a filtering agent for removing from said products the color bearing compounds, to the degree demanded by the trade.

Fullers' earth, either a variety imported from England, or a domestic variety from Florida, known as Floridin fullers' earth is usually employed. But comparatively recently a deposit of good bleaching earth has been found in Death Valley, California. While the chemical analysis of this Death Valley clay is practically equivalent to that of Floridin fullers' earth, its physical characteristics are quite different, in that it completely disintegrates when brought into contact with water, and, therefore, can be used only in an extremely finely divided condition; and also it contains water-soluble and acid-soluble compounds which interfere with the bleaching effect and which must be removed by treatment with sulfuric or other acid.

My present invention concerns the preparation of clay for its use in bleaching petroleum products, and while not confined to any particular decolorizing earth, is especially adapted for Death Valley clay, in that by my method I am able to properly prepare it under economic conditions, due chiefly to the continuous feature of my process in contrast to the more expensive and practically prohibitive "batch" methods heretofore tentatively practiced, and in which the high expense involved in equipment, labor operating charges, excessive quantities of well water for washing and waste of treating acid, are quite marked.

The nature of my invention will be fully described in and ascertained by the following specification, in connection with the accompanying drawing in which the figure is a diagrammatic view of an apparatus suitable for carrying out my method.

Referring to the drawing—1 is a storage bin to which the crude clay is supplied by a conveyer 2. 3 indicates a plurality or series of agitators, in which 4 is the agitating element. These agitators are relatively successively disposed to enable a flow of their contents, by gravity, from one to the next, through the lines 5.

The clay bin 1 discharges its contents through a line 6, to the first of the series of agitators 3.

7 is a tank containing an acid reagent in practice concentrated sulfuric acid. Into this tank enters an air pressure line 8, and from it emerges an acid-feed line 9 which discharges into the first agitator 3. 10 is a series of vessels which constitute washing and thickening effects and which for convenience I shall herein call "thickeners" in that they serve to condense their contents by thorough incorporation into what may be termed a slime. In each of these thickeners, is indicated the mixing elements 11 in the lower portion and the distributing element 12 in the upper portion. The thickeners are relatively arranged at different levels, the first being the lowest and the last the highest. A line 13 leads from the bottom of the first thickener to a pump 14, which discharges the slime taken from said thickener onto a cascade chute 15 which delivers the slime into the distributor 12 of the second thickener. A similar line 13 and pump 14 deliver the slime from the second thickener to the cascade chute 15 of the third thickener, and a similar line, pump and cascade chute connect the third and fourth thickeners.

16 is a line by which the last agitator 3 delivers its contents to the first thickener.

17 is a rotary filter and 18 is its tank. A slime line 19 leads from the last thickener to a pump 20 which delivers through a line 21 to the tank 18 of the rotary filter 17.

The clay cake formed on the rotary filter 17 is passed by a conveyer line 22, down into a dryer 23, the furnace element of which is indicated by 24. The dryer delivers to a crushing mill 25 which, through a conduit 26, delivers to a bin 27 for the prepared clay. From the rotary filler 17 lead lines 28 to convey the neutral-filtrate separated from the clay to a receiver 29. A moisture trap 30 is connected with the receiver 29 by a line 31, and said trap has a line 32 leading to a vacuum pump, not shown. From the receiver 29 issues a line 33 to a pump 34, which by a line 35 delivers the neutral filtrate to the cascade chute 15 of the last thickener 10.

36 is a line of water supply. This leads into a heat interchanger 37, having an inlet line 38 for the live steam and an outlet line 39 for the steam condensate. The heat interchanger 37 discharges its hot water for washing through a line 40 leading down to the cascade chute 15 of the last thickener 10.

A line 41 leads from line 40 to the first agitator 3, in order to convey hot water thereto to be used in starting the process or for the purpose of fluid make up.

42 is a lime-feed bin, which through a line 43 discharges into the cascade chute 15 of the last thickener 10. A line 44 leads from the upper portion of the first thickener 10 to a pump 45, which by a line 46 delivers weak acid to the first agitator 3.

At 47 is indicated a void for the weak acid line 46. A line 48 leads from the upper portion or launder of the last thickener to the cascade of the preceding thickener and like lines lead back from the launder of each thickener to the first one.

My method or process carried out in this apparatus is as follows. The crude clay from the bin 1 is fed in a continuous stream through line 6 into the first agitator 3, together with a stream of concentrated sulfuric or other acid from the acid tank 7, through line 9. Also during the process of operation as will presently appear, weak acid liquor from the first thickener 10 is pumped through line 46 into the first agitator 3; and at the start or as operations may require hot water is supplied to said agitator through line 41. The stream of crude clay, concentrated acid, weak acid liquor and hot water flows successively through the agitators 3 in which necessary chemical reactions occur and in each of which the ingredients are thoroughly mixed; thence the mixture flows through line 16 to the first thickener 10. From the bottom of this thickener the slime is pumped through line 13 into the cascade chute 15, which delivers it into the cascade chute of the second thickener and so on, the slime being pumped through successive thickeners into the cascade chute of the last thickener. From this last thickener, the slime is taken through the line 19, by the pump 20, and delivered through the line 21 to the tank 18 of the rotary filter 17. By the filter a large proportion of the moisture is separated as a neutral filtrate from the wet clay cake, and the latter is delivered by the conveyer line 22 to the drying furnace 23, from which it passes to the pulverizing mill 25 and thence to the prepared clay storage bin 27. The neutral filtrate water from the filter 17 passes through lines 28 to the receiver 29, and thence by the pump 34 is passed back through the line 35 to the cascade chute of the last thickener 10. Fresh hot water is also delivered to the cascade chute of said last thickener by the line 40 from the heat interchanger 37. This stream of mixed neutral filtrate and fresh hot water flows counter-current to the slime stream from the last thickener through the lines 48 of each thickener successively to the first thickener, increasing in acidity as it washes the slime. From the launder of the first thickener, this weak acid liquor is discharged by the pump 45 through the line 46 into the first agitator as before mentioned.

In order to complete the neutralization of all remaining acid in the washed slime entering the cascade chute of the last thickener, lime hydrate or lime oxide or other neutralizing agent is delivered from lime-feed bin 42 through conveyer line 43 into the cascade chute of said last thickener. All flows in the method are continuous.

I claim:—

1. The method of preparing clay for bleaching petroleum products which consists in passing a stream of crude clay and an acid reagent through a series of agitating means to mix them; passing a stream of said mixture through a series of thickening and washing means to reduce it to a slime; passing a stream of said slime to a filtering means to separate the clay from the liquid filtrate; passing a stream of the liquid filtrate so separated, through the thickening and washing means counter-current to the flow of the slime therethrough; drying the filtered clay and, finally crushing the dried clay.

2. The method of preparing clay for bleaching petroleum products which consists in passing a stream of crude clay and an acid reagent through a series of agitating means to mix them; passing a stream of said mixture through a series of thickening and washing means to reduce it to a slime; passing a stream of said slime to a filtering means to separate the clay from the liquid filtrate; passing a stream of the liquid filtrate so separated, through the thickening and washing means counter-current to the flow of the slime therethrough to wash out the acid therefrom; passing a stream of the weak acid so washed out back and adding it to the mixture of crude clay and acid reagent at the head of the stream passing through the agitating means; drying the filtered clay; and finally crushing the dried clay.

3. The method of preparing clay for bleaching petroleum products which consists in passing a stream of crude clay and an acid reagent through a series of agitating means to mix them; passing a stream of said mixture through a series of thickening and washing means to reduce it to a slime; passing a stream of said slime to a filtering means to separate the clay from the liquid filtrate; passing a stream of the liquid filtrate so separated, together with fresh hot water, through the thickening and washing means counter-current to the flow of the slime therethrough to wash out the acid therefrom; passing a stream of the weak acid so washed out back and adding it to the mixture of crude clay and acid reagent at the head of the stream passing through the agitating means; drying the filtered clay; and finally crushing the dried clay.

4. The method of preparing clay for bleaching petroleum products which consists in passing a stream of crude clay and an acid reagent through a series of agitating means to mix them; passing a stream of said mixture through a series of thickening and washing means to reduce it to a slime; passing a stream of said slime to a filtering means to separate the clay from the liquid filtrate; passing a stream of the liquid filtrate so separated, together with fresh hot water and a neutralizing agent, through the thickening and washing means counter-current to the flow of the slime therethrough to wash out the acid therefrom; passing a stream of the weak acid so washed out back and adding it to the mixture of crude clay and acid reagent at the head of the stream passing through the agitating means; drying the filtered clay; and finally crushing the dried clay.

In testimony whereof I have signed my name to this specification.

CHARLES WALCOTT STRATFORD.